W. E. BEAMES.
Arm-Pit Shield.

No. 8,331. Reissued July 16, 1878.

Witnesses:
M. Georger
D. P. Cone

W. E. Beames
Inventor:
by his attorney
M. Bailey

UNITED STATES PATENT OFFICE.

WILLIAM E. BEAMES, OF NEW YORK, N. Y.

IMPROVEMENT IN ARMPIT-SHIELDS.

Specification forming part of Letters Patent No. 132,348, dated October 22, 1872; Reissue No. 8,331, dated July 16, 1878; application filed July 1, 1878.

*To all whom it may concern:*

Be it known that I, WILLIAM E. BEAMES, of the city, county, and State of New York, have invented certain Improvements in Ladies' Shields, a new article of manufacture, of which the following is a specification:

The object of my invention is to manufacture and provide an improved shield or protector, to be placed in the armpits of ladies' dresses, which shall be thinner and more comfortable to wear, not liable to rip open, and cheaper to manufacture than those hitherto used for this purpose.

Hitherto shields for the protection of dresses have been made of two pieces, glued, cemented, or sewed together at the bend. This mode of construction is in every respect objectionable. The article is thicker at the seam than elsewhere, and thus is uncomfortable to wear. It is also liable, owing to the constant heat and moisture at the armpit, to rip open where the two pieces are joined, inasmuch as the thread, if that be used, speedily rots, or the glue or cement, if either be used, dissolves.

To overcome these difficulties and objections is the object of my invention, which consists of a formed dress-shield, which, whatever may be its thickness or structure otherwise, is seamless—that is to say, is formed from end to end of a continuous piece—thus avoiding any transverse ridge, rib, or overlapping joint or seam at the bend, and presenting an unbroken surface throughout.

In order to describe my invention more fully I refer to the accompanying drawing, forming part of this specification.

Figure 1:
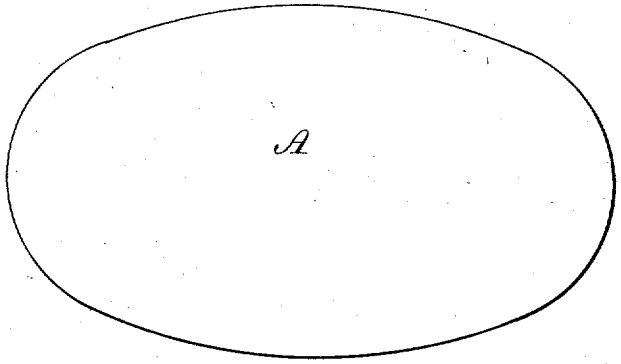
Figure 2:
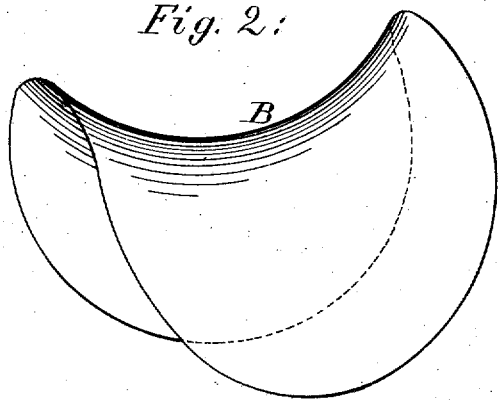

I take a piece, A, of muslin, linen, or other material used for an armpit-shield. To this piece, by the aid of a proper form, made for the purpose, and a hot iron, I give the shape indicated at B, Figure 2, the piece being folded or bent into proper form, and presenting for wear a surface which is unbroken, and not, as heretofore, made up of separate pieces, united by sewing, or gluing, or cementing. The article will retain its shape as long as the fabric lasts, this being simply and readily effected by laying what may be termed the "blank"—that is to say, the flat piece of fabric, such as shown in Fig. 1—on a form, which may be of wood or metal, and then pressing thereon with a heated iron, which will cause the material to take the shape of the form.

Having described my invention, what I claim, and desire to secure by Letters Patent, is—

As a new article of manufacture, a formed seamless armpit-shield, substantially as set forth.

In testimony that I claim the foregoing I have hereunto set my hand this 29th day of June, 1878.

W. E. BEAMES.

Witnesses:
A. SHERMAN,
P. F. CHAMBERS.